United States Patent
Mann

(10) Patent No.: US 9,460,129 B2
(45) Date of Patent: Oct. 4, 2016

(54) METHOD FOR TRACKING A SCHEMA IN A SCHEMA-LESS DATABASE

(71) Applicant: VMware, Inc., Palo Alto, CA (US)

(72) Inventor: Ron J. Mann, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 253 days.

(21) Appl. No.: 14/043,061

(22) Filed: Oct. 1, 2013

(65) Prior Publication Data

US 2015/0095298 A1   Apr. 2, 2015

(51) Int. Cl.
G06F 17/30   (2006.01)

(52) U.S. Cl.
CPC ..... *G06F 17/30292* (2013.01); *G06F 17/3033* (2013.01); *G06F 17/30289* (2013.01); *G06F 17/30628* (2013.01)

(58) Field of Classification Search
CPC ............... G06F 17/30292; G06F 17/3033; G06F 17/30628; G06F 17/30289
See application file for complete search history.

(56) References Cited

U.S. PATENT DOCUMENTS

| | | | |
|---|---|---|---|
| 7,346,598 B2 | 3/2008 | Arora et al. | |
| 7,774,321 B2 | 8/2010 | Tomic et al. | |
| 7,783,614 B2 | 8/2010 | Jones et al. | |
| 7,827,546 B1 | 11/2010 | Jones et al. | |
| 8,145,667 B2 | 3/2012 | Leung | |
| 8,868,926 B2 * | 10/2014 | Hunt et al. | 713/189 |
| 8,938,416 B1 * | 1/2015 | Cole et al. | 707/607 |
| 2005/0172217 A1 | 8/2005 | Leung | |
| 2008/0243811 A1 | 10/2008 | He et al. | |
| 2012/0239612 A1 * | 9/2012 | George et al. | 707/602 |
| 2013/0103729 A1 * | 4/2013 | Cooney | G06F 17/30126 707/831 |
| 2013/0138646 A1 * | 5/2013 | Sirer | G06F 17/30545 707/736 |
| 2014/0149466 A1 * | 5/2014 | Sato et al. | 707/803 |
| 2014/0201194 A1 * | 7/2014 | Reddy | G06F 17/30554 707/722 |

FOREIGN PATENT DOCUMENTS

WO    WO 03/044634    5/2003

* cited by examiner

*Primary Examiner* — Bruce Moser

(57) ABSTRACT

Systems and methods are described for obtaining, for insertion into a schema-less database, a data object that comprises a plurality of key and value pairs. The method also includes hashing the keys associated with the plurality of key and value pairs. The hashing includes executing a hash function to generate a hashed data object. The method also includes comparing the hashed data object to a plurality of first hashed data objects and determining that the hashed data object does not match any of the first hashed data objects. Based on the determining, the method includes associating the hashed data object with the first hashed data objects to generate second hashed data objects and generating a schema for the database. The schema includes a hierarchy of keys that represent the second hashed data objects.

30 Claims, 8 Drawing Sheets

340

```
Template: VMConfig
{ "VirtualMachine" : [
    {
      "summary" : { "config" : {
        "memorySizeMB" : "",
        "numCpu" : ""
      }},
      "@qs : id" : "urn : vmomi : VirtualMachine : vn - 31 : 56CB4DE8 - 7EF9 - 45C2 - A809 - 63BC6DB4F6AF"
    },
    {
      "summary" : { "config" : {
        "memorySizeMB" : "",
        "numCpu" : ""
      }},
      "@qs : id" : "urn : vmomi : VirtualMachine : vn - 29 : 56CB4DE8 - 7EF9 - 45C2 - A809 - 63BC6DB4F6AF"
    },
    {
      "summary" : { "config" : {
        "memorySizeMB" : "",
        "numCpu" : ""
      }},
      "@qs : id" : "urn : vmomi : VirtualMachine : vn - 30 : 56CB4DE8 - 7EF9 - 45C2 - A809 - 63BC6DB4F6AF"
    },
342 {
    {
      "summary" : { "config" : {
        "memorySizeMB" : "6144",
        "numCpu" : "2"
      }},
      "@qs : id" : "urn : vmomi : VirtualMachine : vn - 20 : 56CB4DE8 - 7EF9 - 45C2 - A809 - 63BC6DB4F6AF"
    },
    {
344 {
      "summary" : { "config" : {
        "memorySizeMB" : "1024",
        "numCpu" : "1"
      }},
      "@qs : id" : "urn : vmomi : VirtualMachine : vn - 18 : 56CB4DE8 - 7EF9 - 45C2 - A809 - 63BC6DB4F6AF"
    },
    {
346 {
      "summary" : { "config" : {
        "memorySizeMB" : "2048",
        "numCpu" : "2"
      }},
      "@qs : id" : "urn : vmomi : VirtualMachine : vn - 19 : 56CB4DE8 - 7EF9 - 45C2 - A809 - 63BC6DB4F6AF"
    },
```

FIG. 3D

METHOD FOR TRACKING A SCHEMA IN A SCHEMA-LESS DATABASE

TECHNICAL FIELD

This document relates to schema-less databases and more particularly to tracking an organizational structure of a schema-less database.

BACKGROUND

Many types of databases employ a schema to map data content to data attributes. In a relational database, the schema may group a collection data attributes and their corresponding data items into a logical entity known as a table. Each data attribute is referred to as a "column" and each unique set of related data items is referred to as a "row." Each row in the table is uniquely identified by a special column, a primary key. By understanding the description of the schema (e.g. the tables, columns, etc.) a database user can retrieve data by referring to the data attributes without the knowledge of the actual data content.

SUMMARY

Systems and methods are disclosed for tracking a schema for information in a schema-less database as information is added to the database. Schema-less databases can include collections of data that can be useful to users who did not author or provide information to the schema-less databases. The techniques described in this disclosure enable users to access and manipulate data in a schema-less database without prior knowledge of the database or information in the database and without employing database dumping techniques. In general, as the schema-less database dynamically accumulates data content, the systems and methods described below can dynamically track the organization of database as new information is inserted into the database. In some embodiments, the tracking of database organization is represented by a modifiable and perpetually changing database schema.

In general, one aspect of the subject matter described in this specification can be embodied in methods that include the actions of obtaining, for insertion into a schema-less database, a data object that comprises a plurality of key and value pairs; hashing the keys associated with the plurality of key and value pairs, wherein the hashing includes executing a hash function to generate a hashed data object; comparing the hashed data object to a plurality of first hashed data objects; determining that the hashed data object does not match any of the first hashed data objects and, based on the determining, associating the hashed data object with the first hashed data objects to generate second hashed data objects; and generating a schema for the database, the schema comprising a hierarchy of keys that represent the second hashed data objects. Other embodiments of this aspect include corresponding systems, apparatus, and computer programs.

These and other aspects can optionally include one or more of the following features. An ordered representation of the plurality of key and value pairs can be generated. The plurality of key and value pairs can comprise one or more nested key and value pairs. Generating the schema for the database can comprise generating a directory for accessing content in the database, the directory configured to provide an association between the hierarchy of keys that represent the second hashed data objects and text corresponding to the keys associated with plurality of key and value pairs; and providing the directory to an application in response to receiving a request to retrieve content from the database. Generating the ordered representation of the plurality of key and value pairs can comprise ordering the keys associated with the plurality of key and value pairs according to a predetermined order. Hashing the keys associated with the plurality of key and value pairs can comprise hashing the ordered representation of the plurality of key and value pairs using the hash function to generate the hashed data object comprises combining the ordered keys and then hashing the combination using the hash function. Based on receiving a request for content stored in the database, a template can be generated using the schema to retrieve the content, wherein the template comprises a set of one or more executable queries that use the schema to organize the content; and providing, using the template, a version of the requested content in a graphical user interface. The first hashed data objects can represent telemetry data associated with a plurality of users accessing one or more virtual machines. The schema can be stored as a separate data object in the database. Comparing the hashed data object to the plurality of first hashed data objects can comprise determining whether an object type of the hashed data object matches an object type associated with the first hashed data objects. And the data object can be inserted into the database.

Particular embodiments of the subject matter described in this document can be implemented so as to realize one or more of the following advantages. A schema tracking application can maintain an up to the moment view (e.g., dynamic schema) of information in a database. In addition, the schema tracking application can provide a low processing cost for maintaining the dynamic schema because incoming data objects are scanned once upon being placed into the database rather than each time a schema is re-determined.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-D represent screen shots of example user interfaces used to generate templates that summarize telemetry data.

Like reference numbers and designations in the various drawings indicate like elements.

DETAILED DESCRIPTION

Figure 1:
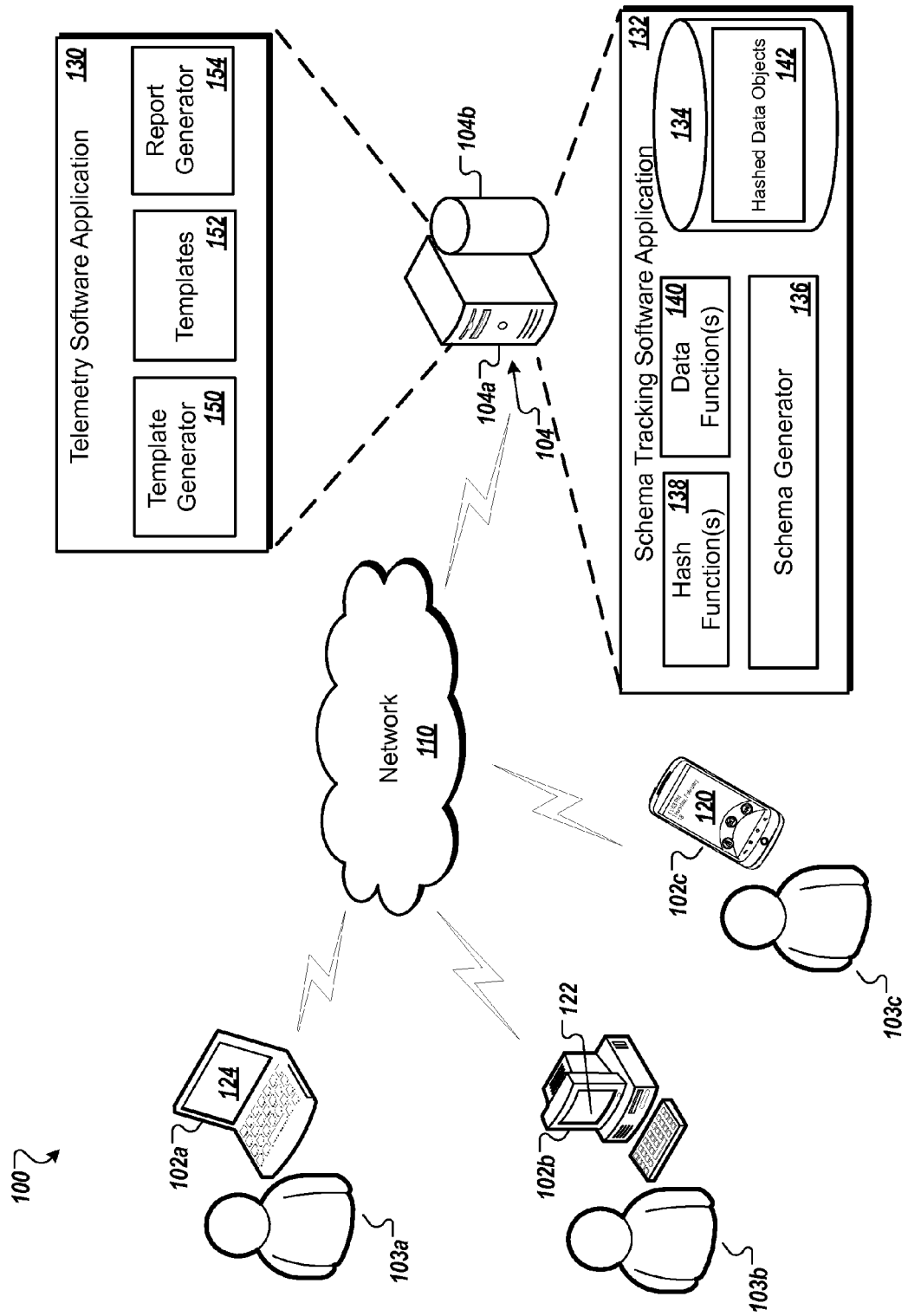
FIG. 1 is a block diagram illustrating an example system that can execute implementations of the present disclosure.

FIG. 1 is a block diagram illustrating an example system 100 that can execute implementations of the present disclosure. The system 100 includes one or more client devices (e.g., client devices 102*a-c*) that can communicate with one or more computing systems (e.g., computing system 104) over a network 110. A user (e.g., users 103*a-c*) can use the system 100 to execute a telemetry software application 130, or another application, for generating templates, graphics, and/or reports that can be used to analyze collected telemetry data pertaining to virtual machine deployments. For example, users 103a-c can enter information or queries into a user interface displayed on display devices 124, 122, 120, respectively. In some embodiments, the application 130 can represent other software applications that are programmed to process data.

The telemetry software application 130 can utilize information in a number of databases in order to generate templates, graphics, and/or reports for a user. The telemetry software application 130 can be used to access a database to retrieve information for a user. The retrieved information can be used to generate a template to create summary data, report data, configuration data, and/or analyzed telemetry data that captures usage and implementation data corresponding to usage and implementation of one or more virtual machines. The templates can be executed, using telemetry application 130, to output data to the users 103a-c in a graphical user interface, for example.

The telemetry application 130 can access schema-based databases, such as database 104b as well as schema-less databases, such as database 134. The schema-based databases generally require a pre-defined schema that defines a set of rules (e.g., constraints) for how content is structured or organized in the database. The constraints typically define how portions of stored data can be mapped to other portions of stored data in the database. The schema can also include data and metadata that describe relationships between attributes associated with stored data as well as a number of constraints that define how the data can be accessed by an outside application.

In some embodiments, the schema can be used to define which data types can be stored in the database. A data type can refer to a classification that defines the class of data (e.g., floating point number, integer, text, and so on), the length or size of the data, operations accessible to the data, and/or ways that the data can be stored. For example, if an eXtensible Markup Language (XML) database schema defines a constraint that restricts the storage of strings greater than 32 bytes, documents that do not follow the constraint can be deemed invalid and unable to be stored in the database, based on the incompatibility with the constraint on strings.

In a schema-less database, data can be stored in a hierarchical fashion without the use of a pre-defined schema. For example, schema-less databases, such as database 134, can store key and value pairs that provide a way to access content in the database 134. In particular, a key and value pair is generally represented as a data structure expressed in the form <key, value>. A key can represent an identifier or name and a value can represent data associated with the key. A key can identify, for example, a specific software program and the type of data stored in the associated value. For example, the software program can be a virtual machine and the associated value can be telemetry data related to memory usage in the virtual machine.

As content is inserted into the schema-less database 134, a schema tracking application 132 can generate a schema that represents a structure or organization of the schema-less database 134 at a specific point in time. For example, by inserting data objects (e.g., key and value pairs) into the database 134, the users 103a-c can use the system 100 to execute an instance of the schema tracking application 132 to generate a new schema. The new schema represents the structure or organization of the database 134 at a point in time given all data objects that have been inserted into the database as of the point in time. The schema can be updated on the fly as new data objects are added to the database 134. In addition, the schema can be, for example, stored as a data object in the database 134.

In the example of FIG. 1, the schema tracking application 132 can be implemented as one or more computer programs running on one or more computers (e.g., server 104a) in one or more locations that can communicate with each other and with the client devices 102a-c through a network (e.g., network 110). The schema tracking application 132 can dynamically generate and maintain a schema for the schema-less database 134 by using a series of hashing and merging of data objects, as will be described below. Each data object is a data structure that contains content and metadata pertaining to the content. Although various types of data objects can be implemented by system 100, the examples below generally describe the use of JavaScript Object Notation (JSON) objects. JSON objects can include one or more key and value pairs, including nested key and value pairs. A key is a description or a name of data stored in the object while the value is the actual data content. For example, in a personnel database, the key could be "social security number" and the value would be an employee's social security number.

In much the same fashion as the schema tracking application 132 described above, the telemetry application program 130 can be implemented as one or more computer programs running on one or more computers (e.g., server 104a) in one or more locations that can communicate with each other and with the client devices 102a-c through a network (e.g., network 110). The telemetry application program 130 can access data stored on a server database 104b or other connected database (e.g., schema-less database 134).

As used in this disclosure, a database can refer to a collection of data. The data can be structured in any particular way, if structured at all, and it can be stored on storage devices in one or more geographic locations. For example, the databases 104b and/or schema-less database 134 can include multiple collections of data, each of which can be organized, stored, and accessed differently. In operation, data can be stored in the databases 104b and 134. Applications 130 and 132 can access the stored data in databases 104b and/or 134 in order to generate templates and schemas.

The network 110 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or a combination thereof. In some embodiments, a web browser running on a client device can use network 110 to host the telemetry application 130 and/or schema tracking application 132.

The client devices 102a-c represent data processing apparatus such as, for example, phones, tablet computers, notebook computers, laptop or desktop computers, PDAs, smart phones, or other stationary or portable devices. Among other components, the client devices 102a-c can include one or more processors, computer readable media that store software applications (e.g., a browser), an input module (e.g., a keyboard or mouse), a communication interface, and a display device (e.g., display devices 124, 122, and 120, respectively). For example, a client device can access application software on the computing system 104 that allows a user to create templates for organizing and outputting telemetry data corresponding to virtual machine usage.

As shown in FIG. 1, the schema tracking application 132 includes the schema-less database 134, a schema generator 136, hash functions 138, and data functions 140. In some embodiments, the schema-less database 134 contains telemetry data and/or metadata associated with a number of users accessing one or more virtual machines. For example, users accessing virtual machines can generate statistics (e.g., telemetry data) that represent how and when particular virtual machines are being utilized. The utilization data can include software versioning information, resource usage, allocated memory access, operating systems in use, just to name a few examples.

In some embodiments, the user can determine which telemetry information to provide to the database 134. For example, the user can select to retain particular information locally, and allow other information to be uploaded into database 134. One example of information that can be retained locally can include personal information, such as social security numbers, Internet Protocol (IP) addresses, or names, based on the sensitivity of the information. The user can choose to not upload such telemetry data into the database 134 and as such, the telemetry application 130 will not have access to the sensitive data.

The database 134 can store a number of data objects. The data objects can be received from users or other modules in the schema tracking application 132. For example, the schema tracking software application 132 can receive a data object for insertion into the database 134 or for modification of an existing data object in the database 134. The application 132 can use hash functions 138 and/or data functions 140 to perform data manipulation on the keys of the received data object. The result of the data manipulations can, for example, generate hashed data objects 142, shown stored in the database 134. The hashed data objects 142 represent hashed keys of previously received data objects and can be used to generate a schema for the database 134. In some embodiments, the schema generator 136 can generate a schema from the hashed data objects 142, as will be described further below.

When a data object is received for insertion into the database 134 or a change to an existing data object is received, the schema tracking software application 132 intercepts the insertion or modification and performs analysis of the key(s) of the data object. The keys of the data object are hashed (e.g., using one or more hash functions 138 and/or data functions 140) and then compared to the hashed data objects 142. If there is a match, the hashed keys of the data object have previously been received and do not need to be added to the hashed data objects 142. Otherwise, they hashed keys of the data object are added to the hashed data objects 142.

The hash functions 138 generally include procedures or mathematical functions that can convert large amounts of data or variably sized amounts of data into a smaller form. The smaller form can be a single integer, a table, or an array of values, for example. In some embodiments, the smaller form can serve as an index to other data stored in the database 134. The hash functions 138 can include a number of commutative or associative data techniques. For example, hash functions 138 can be used to perform an exclusive OR (e.g., XOR), exclusive AND (e.g., XAND), indexing techniques, addressing techniques, etc. Example hash functions can include SHA-0, SHA-1, SHA-2, MD4, MD5, just to name a few. Other hash functions can be implemented. Data functions 140 can include any data handling or manipulating technique including, but not limited to merging, sorting, data encapsulation, storing, etc.

When a user wishes to understand the layout or organization of the internal data of the schema-less database 134, the schema tracking software application 132 can obtain a schema from the hashed data objects 142 and provide the schema to the user. The organization can be used to generate templates and/or reports from the database content. Such templates and reports can be generated using the telemetry application 130, for example. The telemetry application 130 represents a hierarchical visualization tool that allows a user to analyze content in the database 134.

As shown in FIG. 1, the telemetry application 130 includes a template generator 150, templates 152, and a report generator 154. The template generator 150 can be used by a user to create templates (e.g., documents) for organizing particular data and/or data fields. The templates 152 can store information for accessing telemetry data in database 104b or 134. In some embodiments, the templates 152 function to gather relevant information about specific aspects about operation and deployment of virtual machines. The templates 154 can be stored and configured for providing access to the report generator 154. In some embodiments, the report generator 154 can generate tabular, graphical, or otherwise organized output of data pertaining to the operation and deployment of virtual machines.

In an example of using the telemetry application 130, a virtual machine software distributor may wish to know which product versions of their virtual machines are used by their customers over a particular time period. The virtual machine distributor can generate a template that indicates (i) a time period (e.g., the last 30 days) and (b) which particular data the distributor wishes to analyze, such as product versions used by each customer. Using this information, the template 152 can be generated by the telemetry application 130. For example, the telemetry application 130 can access the schema-less database 134 using the latest updated schema and retrieve data for all customers that used any virtual machine product in the last 30 days. The telemetry application 130 can additionally retrieve the product versions for each virtual machine in use by the customers.

The template that is generated in the above example can include operations that collect the product usage information for all customers over the last 30 days. In some embodiments, the telemetry application 130 can use the template 152 to generate a report that includes a histogram illustrating a number of distinct products used in the last 30 days of data sorted by customer. This report can be outputted to a graphical user interface for review by the distributor.

Figure 2:
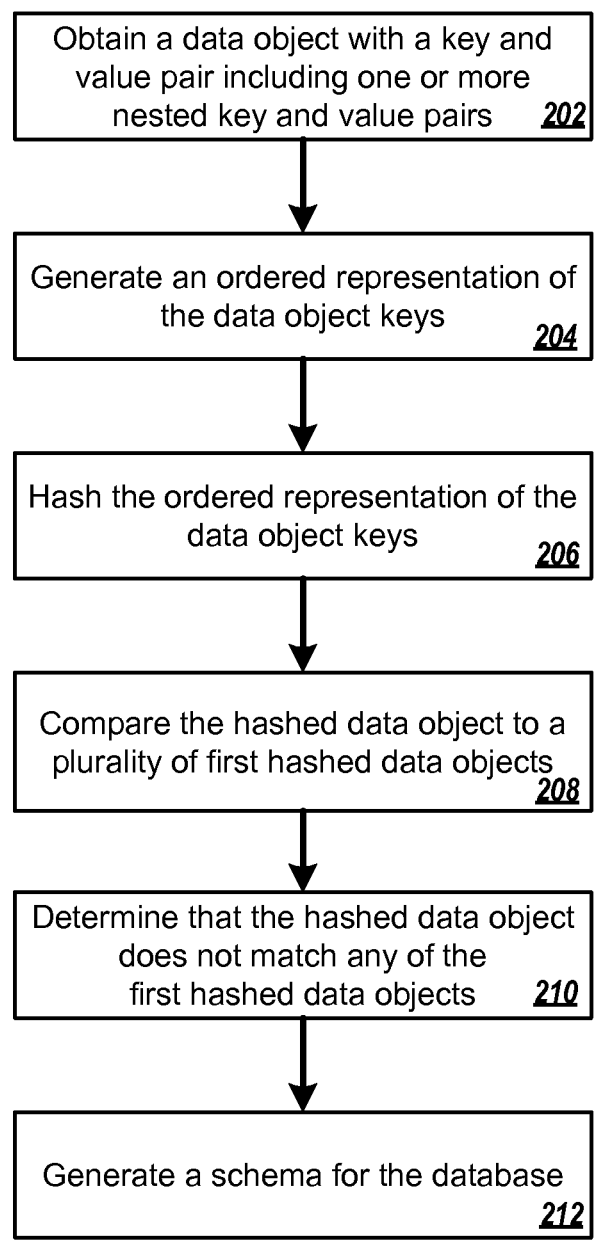
FIG. 2 is a flow chart of an example technique for generating a schema.

FIG. 2 is a flow chart of an example technique 200 for generating a schema. One or more computer programs installed on one or more computers can implement the method 200. The method 200 can be described as being performed by a system of one or more computers. In some embodiments, the system 100 of FIG. 1 can perform the method 200.

Figure 3A:
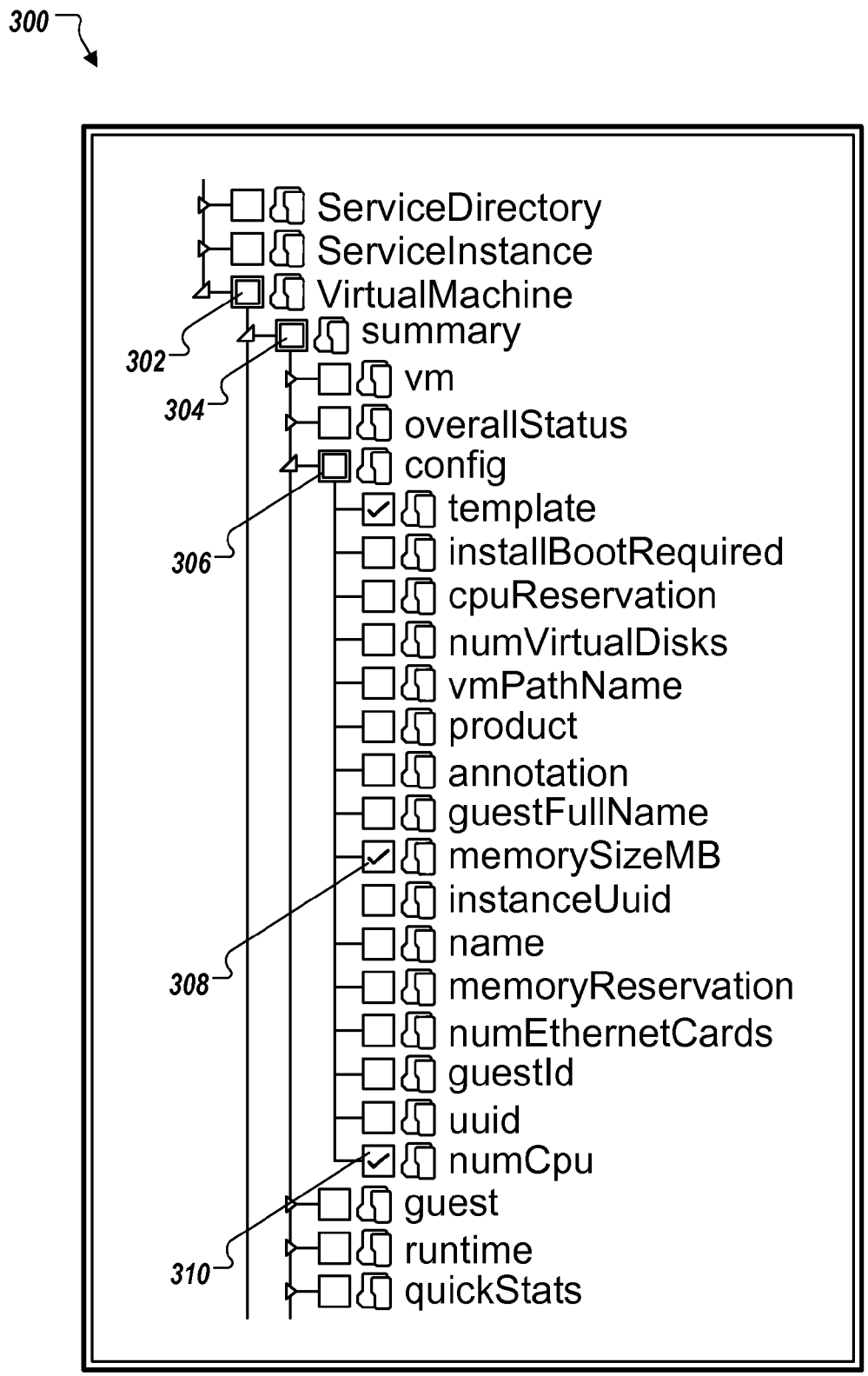

The technique 200 can begin, for example, when a data object is received (202). For example, a user 103a can submit telemetry data that includes one or more data objects for insertion into a database (e.g., database 134). The schema tracking application 132 can receive the one or more data objects. Each data object can include a number of key and value pairs. In some embodiments, each data object includes one or more nested key and value pairs. For example, FIG. 3A depicts a directory structure 300 that shows inventory service content for various virtual machines. The structure includes a number of fields that can represent keys and nested keys associated with content in the database. For example, a "VirtualMachine" field includes a nested "summary" field and the "summary" field further includes several nested fields, some of which include additional nested fields.

An ordered representation of the data object keys is generated (204). For example, to order the data object keys, the schema tracking application 132 can use a data ordering algorithm stored in data functions 140. The data ordering algorithm can be used by application 132 to order the keys of the data objects and the one or more nested keys according to a predetermined order. In some embodiments, the predetermined ordering of keys can include ordering the keys and nested keys in an ascending or descending alphabetical order.

As shown in FIG. 3A, the directory structure 300 includes a "ServiceDirectory" field, a "ServiceInstance" field and a "VirtualMachine" field that are placed in descending alphabetical order. In some embodiments, the ordering of fields includes organizing the fields in an ascending or descending numerical order based on data or metadata that is associated with the data object. In some embodiments, another ordering scheme is selected. The example directory structure 300 includes the descending alphabetical order for some of the fields, but implements a different ordering scheme for the nested fields.

The ordered representation of the data object keys are hashed (206) using a hash function. Hashing the ordered representation of the data object keys using the hash function to generate the hashed data object can, for example, include combining the ordered keys and then hashing the combination using the hash function. The hashing of the ordered keys can generate an output that represents a shortened reference to the original data. This hash can be stored as an object in the database 134, for example.

The hashed data object keys are compared (208) to a plurality of first hashed data objects, such as hashed data objects 142. The hashed data objects 142 represent a number of previously obtained and previously hashed data object keys. The comparison can be performed using one or more data functions 140 in schema tracking application 132. The comparison can include determining whether an object type of the hash data object matches an object type associated with the first hashed data objects. In some embodiments, the comparison step includes simply determining whether or not the hashed data object has been previously obtained or received in the database 134, for example.

If a determination is made (210) that the hashed data object does not match any of the first hashed data objects, the schema tracking application 132 can merge the hashed data object with the first hashed data objects. The merged data objects represent a summary of the organization of the database 134 at a specific point in time.

A schema is generated (212) for the database. The schema can include a hierarchy of keys that represent the merged hashed data objects, for example. In some embodiments, generating the schema for the database includes generating a directory for accessing content in the database. This directory can be configured to provide a relational association between the hierarchy of keys that represent the merged hashed data objects and text corresponding to the data object keys. The directory can be provided to one or more applications in response to receiving a request to retrieve content from the database. For example, in response to receiving a request for content from the telemetry application 130, the schema tracking application 132 can provide this directory to the telemetry application 130. The telemetry application 130 can use the directory to determine a structure for the schema-less database. The telemetry application 130 can use the structure to generate templates for retrieving data, reports for analyzing data, and/or creating template functions that can be repeatedly applied to data retrieved from the schema-less database 134, for example.

In some embodiments, the telemetry application 130 can receive a request for content stored in the database. Based on receiving the request for content, the application 130 can generate a template using the generated schema to retrieve the content. The template can include a set of executable queries that use the schema to organize the content. An executable query can include a snippet of source code that can be executed to retrieve particular content from a database. The result of such a query can include the requested content, which can be displayed and/or stored. The telemetry application 130 can then use the template to provide a representation of the requested content in a graphical user interface.

In some embodiments, particular data objects can intersect one another based on a shared topic, for example. This intersection can be used by telemetry software application 130 to generate a user interface that can associate and provide keys to a user. The keys can be used as a basis for generating a query to the database 134. In a specific example, the application 130 can access information from multiple database sources, such as requesting data about several well-known animal zoos in the United States. Users of system 100 can generate queries against the databases using information associated with the data objects and keys in the database. In this example, a first data object can include information for a first zoo "A zoo" while a second data object can include information about a second zoo "B zoo". The following source code snippet (1) represents the first zoo data object "A zoo".

```
{ "zoo" : {                                    (1)
    "name" : "A Zoo",
    "cages" : 0,
    "animals" : {
        "tigers" : ["Ravenous"],
        "owls" : ["Mr Smarty-Pants"]
    }
  }
}
```

The following source code snippet (2) represents the second zoo data object "B zoo".

```
{ "zoo" : {                                    (2)
    "name" : "B Zoo",
    "animals" : {
        "tigers" : ["Edna", "Hoss", "Purdy"],
        "camels" : ["Drombone"]
    },
    "cages" : 100,
    "veterinary" : {
        "staff" : 15,
        "beds" : 30
    }
  }
}
```

If the two objects were merged by schema tracking software application 132, for example, the merged result can be represented, as shown by source code snippet (3) below.

```
{ "zoo" : {                                    (3)
    "name" : " ",
    "animals" : {
```

```
        "camels" : " ",
        "owls" : " ",
        "tigers" : " "
      },
      "cages" : " ",
      "veterinary" : {
        "beds" : " ",
        "staff" : " "
      }
    }
  }
}
```

A user (e.g., a researcher of zoology) may wish to make a query against a database storing the zoo information. For example the researcher can generate an example query to look for information on tigers associated with a number of zoos. Such a query can include the following snippet of source code {"zoo": {"animals": {"tiger": " "}}}. The researcher generating the query could know a full range of possible keys that represent the animals available in the system prior to generating such a query. However, in some embodiments, the researcher does not have such information about the keys beforehand and in such cases, application 130 and 132 can be used to generate a user interface that can expose the keys available. The researcher can browse the exposed keys to construct one or more queries. Constructing a query after the application 130 generates a user interface can include the researcher beginning to construct a query by drilling down into the data. For example, the researcher can construct a query such as {"zoo": {"animals": { }}}, which would yield the following set of keys ["camels, "owls", "tigers"], based on the two known data objects in the database. Continuing with this example, suppose the researcher has a feline specialty background and would like to know how many felines are in captivity. The research can browse a schema generated by application 132 to construct a query that determines how many tigers are in captivity according to this particular database. The query can include the following snippet of source code {"zoo": {"animals": {"tiger": " "}}}. The query can be constructed and performed and the application 132 can perform a function to determine the size of an array that would be returned by the query. Although other felines besides tigers exist, the current database does not include data for other felines and as such, the user is provided with the most up to date information in the database. In this example, the most up to date feline information includes only information about tigers.

In some embodiments, the schema tracking application 132 receives a data object that includes one or more nested key and value pairs. The schema generator 136 can perform a hash of the nested keys and use the hash to generate a schema. The following source code snippet (4) is an example representation of data objects and nested data objects that can be received by application 132. Equation (5) is an example of how a hash of the data objects in source code snippet (4) can be sorted and hashed for the schema-less database 134.

As shown below, the application 132 receives a data object with a key of 'x' and a value of "yes." The application 132 also receives a data object with the key of 'y' with nested keys of 'z' and 'p,' each with respective values. The application 132 also receives data objects with respective keys 'a', 'b', and 'q', each with associated values.

```
{'x' : "yes",                                    (4)
 'y' : {
    'z' : ["1", "2", "3"],
    'p' : "address"
 },
 'a' : { },
 'b' : "A non null value",
 'q' : " "
}
```

Here, the application 132 can perform a sort and a hash of the keys. For example, the data functions 140 sort the values in an alphabetical order. The hash functions 138 hash the values to obtain:

$$\text{Sorted Hash}=\text{hash}('a'+'b'+'q'+'x'+'y'+('y'+'p')+('y'+'z'))  \quad (5)$$

where the nested keys for 'y' are sorted and hashed using the distributive property to distribute 'y' with both 'p' and 'z' separately, since they are both nested beneath key 'y.' In addition, the schema tracking application 132 can sort received keys in a consistent manner regardless of the order in which the keys are interrogated from the corresponding data objects.

In some embodiments, the schema tracking application 132 can track the schema in order to trigger additional actions in the system 100. For example, the application 132 can be adapted to monitor incoming data objects at a regular interval (e.g., every 30 seconds). The monitored data objects can be associated with one or more keys. These keys can be used as a trigger for the additional actions. For example, the schema tracking application 132 can be configured to programmatically monitor incoming data objects and determine when particular keys have been received. The monitoring can be performed to ensure that expensive analytical operations are carried out on data objects that include specific keys, rather than performed on all received data objects. This monitoring can be performed as part of the process that tracks the schema of the database 134, for example. By tracking the schema, software programs associated with the application 132, can be configured to recognize names of the keys that could arrive in the future, and can remain dormant so as not to waste time or processing resources on searching for non-existent values.

As an example, corporation "X" may be introducing a new widget which has five optionally deployed sub components. The deployed subcomponents can be shown by the following example source code.

```
{ "widget" : {
    "A" : {... lots of A specific stuff... },
    "B" : {... lots of B specific stuff... },
    "C" : {... lots of C specific stuff... },
    "D" : {... lots of D specific stuff... },
    "E" : {... lots of E specific stuff... }
  }
}
```

The widget can be designed to report data back to corporation "X." In this example, both a product marketing team and an engineering team may be anxious to see the initial data from early deployments of the widget. Because the code associated with the "widget" can take months to go from development through manufacturing into the sales channel before being finally installed and operational at customer sites, engineering can create a program that monitors corporation "X's" schema-less database (e.g., schema-less database 134) for the presence of the known key associated with the "widget". In operation, each day the monitoring program can contact the database and read the schema object to check to see if any widgets have reported in. Finally, after a few months, the monitoring program can detect the presence of the widget key, and in response can send an email to interested parties. In addition, the monitoring program can be configured to begin to execute weekly analysis on the incoming widget data, in response to detecting the key associated with the "widget." In this example, it may happen that the "widget" is very popular and within a few weeks there can be several million of them in the field all reporting in daily. Because the schema tracking application 132 is performing analysis on the front end, as data objects are received, the schema can reflect this after a few days, as shown by the following example source code.

```
{ "widget" : {
    "A" : {... lots of A specific stuff... },
    "B" : {... lots of B specific stuff... },
    "C" : {... lots of C specific stuff... }
  }
}
```

Continuing with the above example, on seeing initial analytical reports, the CEO of corporation "X" may be concerned and may wish to know why she wasted millions of development dollars on "widget" options "D" and "E," as no one seems to be using them. Engineering explains that options "D" and "E" are only active for the "widget" when it is deployed alongside one of a pair of new corporation "X" products and that these new products were only released to the field a few days ago, so no information has yet arrived. The CEO may wish to know when any "widget" options "D" or "E" are deployed. With millions of widget instances arriving every day, it may not be practical to continuously scan the database 134 to find the initial traces of option "D" or "E." Accordingly, having the schema tracking can make it possible to retrieve the singular schema object every few seconds and scan it, rather than millions of widget instances, to see if options "D" or "E" have finally arrived. Thus, rather than being forced to search the entire set of widgets in the database every few seconds which can put a strain on other critical ongoing database operations, engineering can simply modify the initial monitoring program to scan the schema tracking object every few seconds and generate an email to the CEO immediately.

FIGS. 3A-D represent screen shots of example user interfaces used to generate templates that summarize telemetry data. The user interfaces can be generated by the telemetry software application 130. Users can access the application 130 to select information for generating templates that can be used and reused to create reports and other analysis documents associated with content in databases 104b and 134.

As shown in FIG. 3A, directory structure 300 includes several fields that can be associated with inventory service content for various virtual machines. In particular, the structure 300 includes a number of fields that can represent information that can be associated with keys and nested keys in the database. For example, a "VirtualMachine" field 302 includes a nested "summary" field 304 and the "summary" field further includes several nested fields, some of which include additional nested fields.

The application 130 can be used to create templates that can generate analyzed telemetry data for particular embodiments of virtual machines in use by end users of virtual machine software, for example. In the example structure 300, a user of application 130 has selected the "VirtualMachine" field 302, the nested "summary" field 304, a nested "config" field 306 and the nested fields "memorySizeMB" 308 and "numCpu" 310. In this example, the user of application 130 may wish to generate a report which gathers relevant information about specific aspects of virtual machine operation and deployment for a number of end users executing virtual machines. The user of application 130 can generate a template that includes executable queries which can be executed against a specified directory, such as directory structure 300. For example, the user of application 130 can generate a template to gather virtual machine information for a number of end users. The selections shown in FIG. 3A can generate a template that includes queries that can be executed against a database. In this example, the template is used to: (a) determine which virtual machines are in use (e.g., using the "VirtualMachine" field 302), (b) generate a summary for the end user configuration for how much memory is in use (e.g., using the "memory SizeMB" field 308), and (c) generate a summary for the end user configuration for how many CPUs are in use (e.g., using "numCpu" field 310).

Figure 3B:
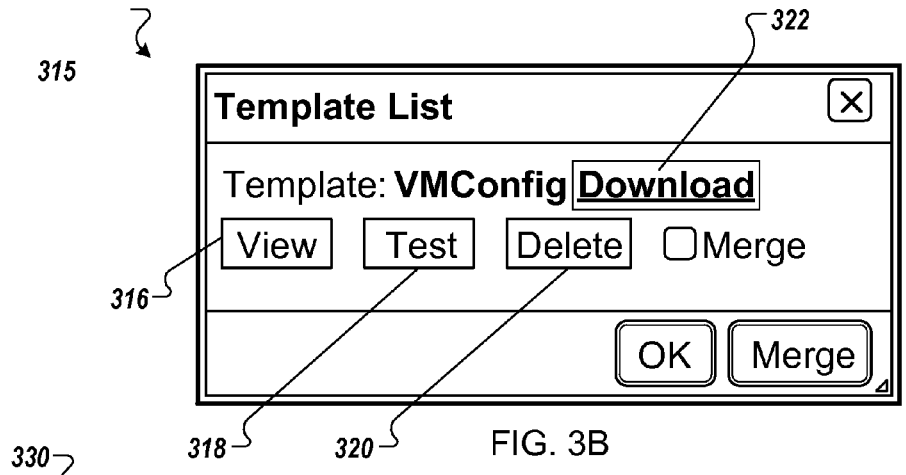

Once the user of application 130 selects the data in structure 300 and generates a template, the template can be configured for use, stored, and tested. FIG. 3B illustrates an example screen shot 315 of options available to a user once a particular template is configured. Here, the user can view the template to view content associated with the template using a view button 316. In addition, the user can test the template using a test button 318. The testing can include executing all or a portion of the queries associated with the template to generate summaries, reports, or other gathered telemetry data. The user can also choose to remove the template from memory storage by selecting a delete button 320. In addition, a download link 322 allows the user to save a particular template to local storage.

Figure 3C:
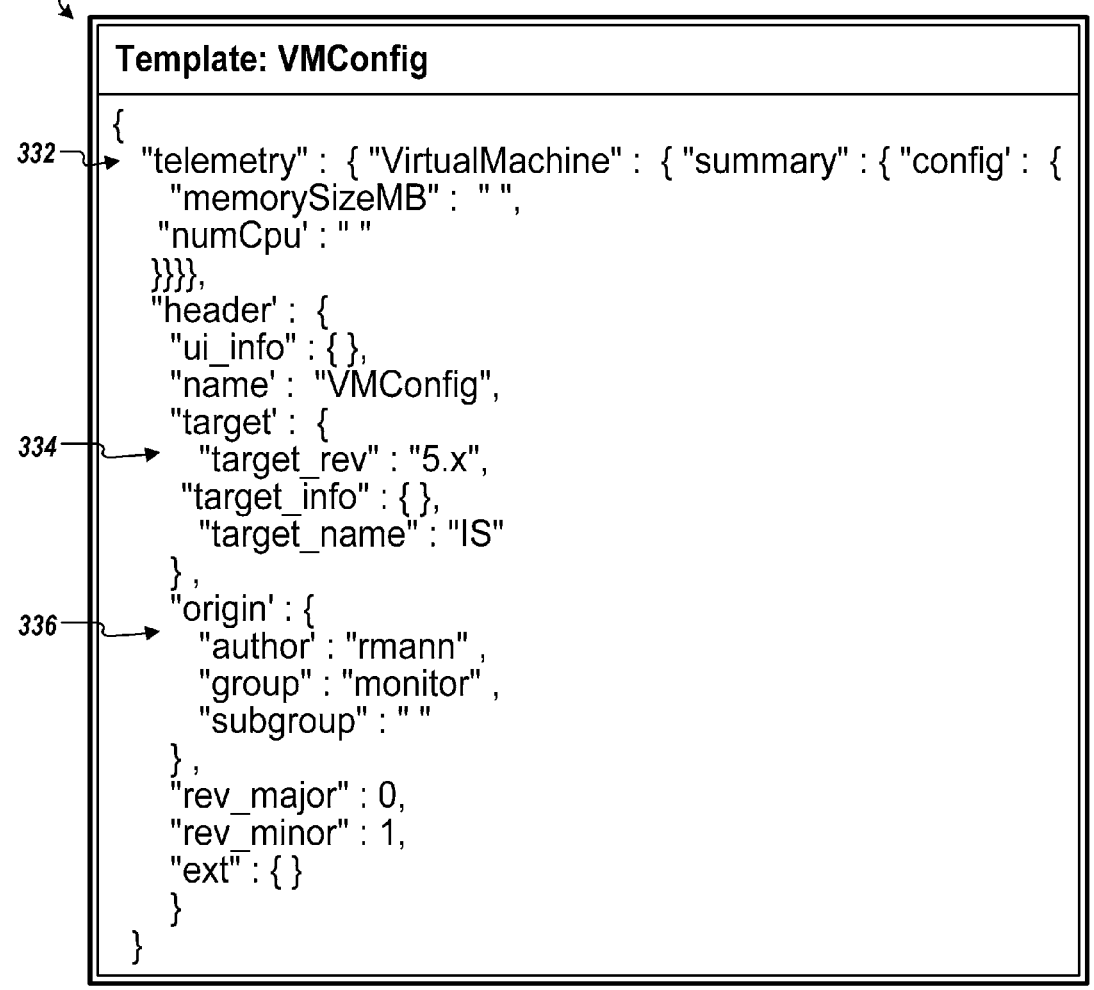

When using the view button 316 to view the template, the user can be presented with source code that identifies the queries generated by the selection of fields, as described in FIG. 3A. An example screen shot 330 of such source code is depicted in FIG. 3C. The user of application 130 can modify the source code to create different data outcomes.

Upon selecting the view button 316, the example screen shot of 330 can be displayed to the user of application 130. The screen shot 330 includes the content of the current template document. In operation, the template can employ JSON to create a specification about which particular content the user wishes to retrieve. In the depicted example in FIG. 3C, the payload generated by the template is stored under a key named "telemetry" 332. The payload includes the memory size in megabytes and the number of CPUs, as requested in the template. In addition to the requested telemetry data, the application 130 can generate versioning information 334, authorship information 336, and other metadata associated with the template.

The source code represented in FIG. 3C can be used to drive a query to retrieve actual content from the Inventory Service structure 300. The query can be executed by selecting the "Test" button 318. Upon selecting the "Test" button 318, a dialog 340 (FIG. 3D) is presented to the user. The dialog 340 includes the requested data for each virtual machine found on the system. The template can be executed and the information returned to the user can be provided in any number of data forms. The data can be presented in a formatted or non-formatted form. As shown in FIG. 3D, the memory size in megabytes and the number of running CPUs are both shown for three virtual machines 342, 344, and 346.

Figure 4A:
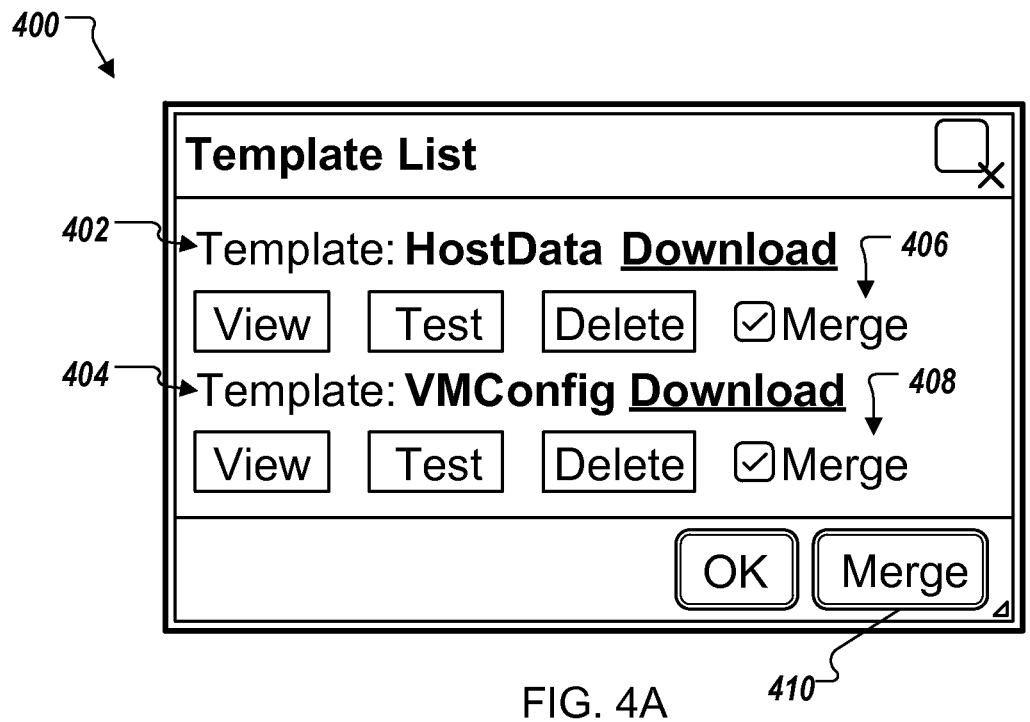
FIGS. 4A-B represent screen shots of example user interfaces used to combine multiple templates.
Figure 4B:
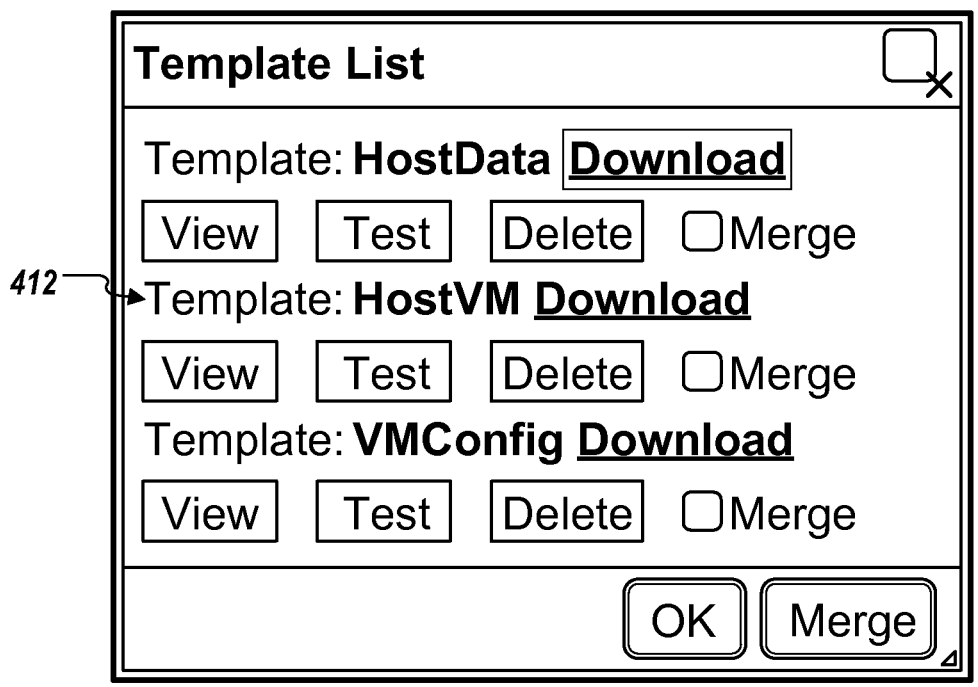

FIGS. 4A-B represent screen shots of example user interfaces used to combine multiple templates. Combining templates can result in merging data associated with multiple templates into a single template. Such a merging of data can be used to generate detailed reports that include data describing telemetry data for virtual machines.

The screen shot 400 in FIG. 4A includes a list of two templates, "HostData" 402 and "VMConfig" 404. Each template 402 and 404 can be generated separately by one or more users accessing telemetry software application 130. In some embodiments, the templates 402 and 404 can be generated by a user. At a later time, the user can determine that she wishes to have information available in template 404 in a report that is generated from template 402. To do so, the user can merge the templates 402 and 404 by selecting checkboxes 406 and 408 next to each respective template 402 and 404. When the user has selected the templates she wishes to merge, she can select a merge button 410 to generate an additional template "HostVM" 412, as shown in FIG. 4B. The template "HostVM" 412 includes the data collected by template 402 and 404 in one executable template 412. In some embodiments, the schema tracking software application 132 can execute multiple instances of itself and a locking mechanism can be implemented while a merging is underway. Once the template merge is completed, the application 132 can unlock or approve further changes to the templates.

Figure 5A:
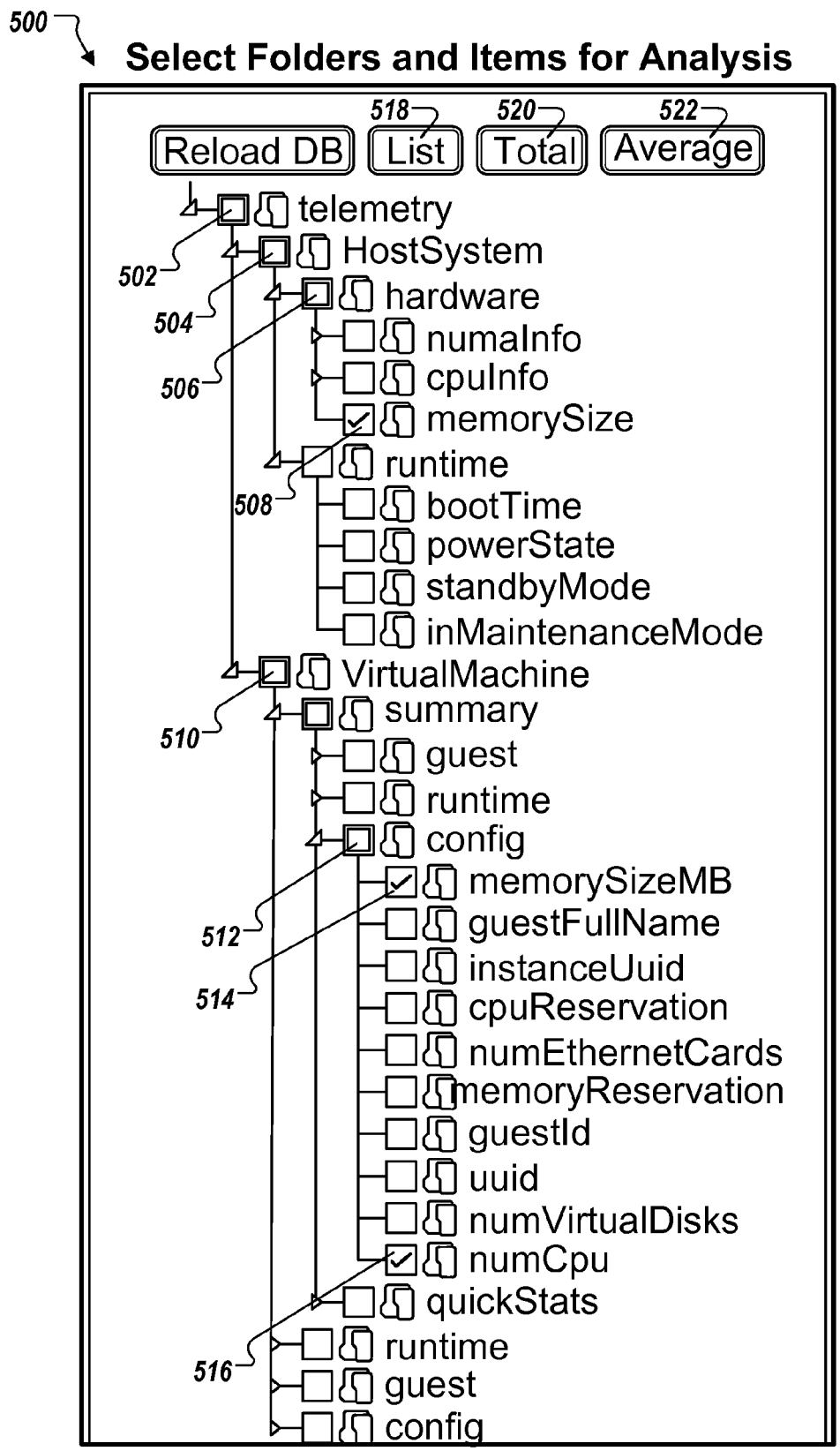
FIGS. 5A-B represent screen shots showing an example of generating and executing a template.
Figure 5B:
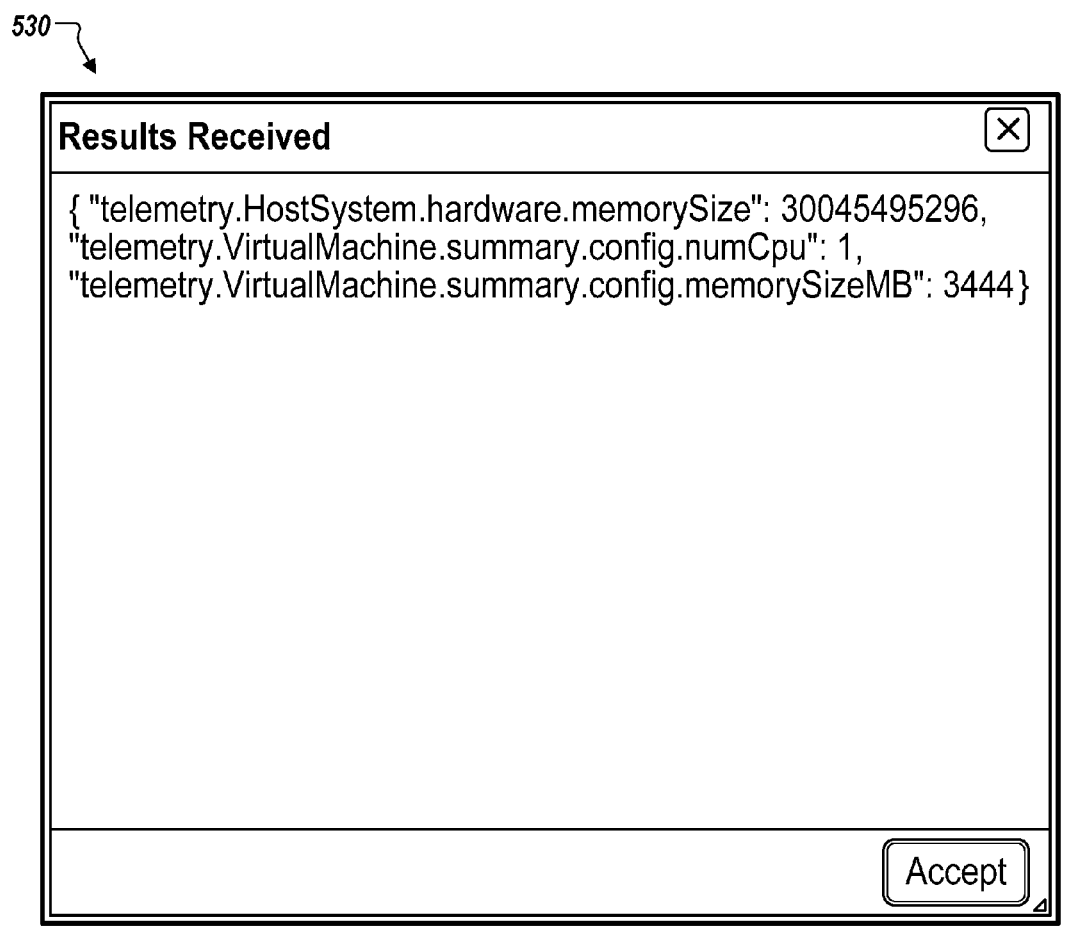

FIGS. 5A-B represent screen shots showing an example of generating and executing a template. A screen shot 500 illustrates a hierarchical view of data that can be used to generate a template from virtual machine telemetry data. A user can access application 130 to view a number of fields that have been hierarchically arranged. In this example, the user wishes to understand how many users are regularly using memory storage of over 1 Terabyte. For example, application 130 can present a list similar to what is shown in screen shot 500. The user can select a "telemetry" data field 502 to ensure that telemetry data for all users is accessed. Next, the user can select a "HostSystem" data field 504 and additionally select nested fields "hardware" 506 and "memorySize" 508 to determine which systems how much memory is allocated on those systems. Next, the user can select a "VirtualMachine" data field 510, and nested fields "config" 512, "memorySizeMB" 514, and "numCpu" 516, the combination of which can provide information related to which virtual machines are configured and how much memory and CPU bandwidth is available.

Upon selecting the combination of fields, the user can choose a number of options to receive report data about the selected options. For example, the user can select a list button 518 to receive a list of the current hardware memory size, how many CPUs are available to the virtual machine, and what the memory size in megabytes is, as shown in screen shot 530 in FIG. 5B. In another example, the user can select a total button 520 to receive a total available memory for all telemetry data. In another example, the user can select an average button 522 to receive the average amount of available memory for all telemetry data.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what can be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In some embodiments, multitasking and parallel processing can be advantageous.

What is claimed is:

1. A computer-implemented method comprising:
   obtaining, for insertion into a schema-less database, a data object that comprises a plurality of key and value pairs;
   hashing the keys associated with the plurality of key and value pairs, wherein the hashing includes executing a hash function to generate a hashed data object;
   comparing the hashed data object to a plurality of first hashed data objects;
   determining that the hashed data object does not match any of the first hashed data objects and, based on the determining, associating the hashed data object with the first hashed data objects to generate second hashed data objects;
   generating a schema for the database, the schema comprising a hierarchy of keys that represent the second hashed data objects;
   based on receiving a request for content stored in the database, generating a template using the schema to retrieve the content, wherein the template comprises a set of one or more executable queries that use the schema to organize the content; and
   providing, using the template, a version of the requested content in a graphical user interface.

2. The method of claim 1, further comprising generating an ordered representation of the plurality of key and value pairs.

3. The method of claim 2, wherein generating the ordered representation of the plurality of key and value pairs comprises ordering the keys associated with the plurality of key and value pairs according to a predetermined order.

4. The method of claim 3, wherein hashing the keys associated with the plurality of key and value pairs comprises hashing the ordered representation of the plurality of key and value pairs using the hash function to generate the hashed data object, which comprises combining the ordered keys and then hashing the combination using the hash function.

5. The method of claim 1 wherein the plurality of key and value pairs comprise one or more nested key and value pairs.

6. The method of claim 1 wherein generating the schema for the database comprises generating a directory for accessing content in the database, the directory configured to provide an association between the hierarchy of keys that represent the second hashed data objects and text corresponding to the keys associated with plurality of key and value pairs; and
   providing the directory to an application in response to receiving a request to retrieve content from the database.

7. The method of claim 1, wherein the first hashed data objects represent telemetry data associated with a plurality of users accessing one or more virtual machines.

8. The method of claim 1, wherein the schema is stored as a separate data object in the database.

9. The method of claim 1, wherein comparing the hashed data object to the plurality of first hashed data objects comprises determining whether an object type of the hashed data object matches an object type associated with the first hashed data objects.

10. The method of claim 1, further comprising inserting the data object into the database.

11. A system comprising:
   data processing apparatus programmed to perform operations comprising:
      obtaining, for insertion into a schema-less database, a data object that comprises a plurality of key and value pairs;
      hashing the keys associated with the plurality of key and value pairs, wherein the hashing includes executing a hash function to generate a hashed data object;
      comparing the hashed data object to a plurality of first hashed data objects;
      determining that the hashed data object does not match any of the first hashed data objects and, based on the determining, associating the hashed data object with the first hashed data objects to generate second hashed data objects;
      generating a schema for the database, the schema comprising a hierarchy of keys that represent the second hashed data objects;
      based on receiving a request for content stored in the database, generating a template using the schema to retrieve the content, wherein the template comprises a set of one or more executable queries that use the schema to organize the content; and
      providing, using the template, a version of the requested content in a graphical user interface.

12. The system of claim 11, further comprising generating an ordered representation of the plurality of key and value pairs.

13. The system of claim 12, wherein generating the ordered representation of the plurality of key and value pairs comprises ordering the keys associated with the plurality of key and value pairs according to a predetermined order.

14. The method of claim 13, wherein hashing the keys associated with the plurality of key and value pairs comprises hashing the ordered representation of the plurality of key and value pairs using the hash function to generate the hashed data object, which comprises combining the ordered keys and then hashing the combination using the hash function.

15. The system of claim 11, wherein the plurality of key and value pairs comprise one or more nested key and value pairs.

16. The system of claim 11, wherein generating the schema for the database comprises generating a directory for accessing content in the database, the directory configured to provide an association between the hierarchy of keys that represent the second hashed data objects and text corresponding to the keys associated with plurality of key and value pairs; and
   providing the directory to an application in response to receiving a request to retrieve content from the database.

17. The system of claim 11, wherein the first hashed data objects represent telemetry data associated with a plurality of users accessing one or more virtual machines.

18. The system of claim 11, wherein the schema is stored as a separate data object in the database.

19. The system of claim 11, wherein comparing the hashed data object to the plurality of first hashed data objects comprises determining whether an object type of the hashed data object matches an object type associated with the first hashed data objects.

20. The system of claim 11, further comprising inserting the data object into the database.

21. A non-transitory machine readable storage medium embodying computer software, the computer software causing a computer to perform a method, the method comprising:
   obtaining, for insertion into a schema-less database, a data object that comprises a plurality of key and value pairs;
   hashing the keys associated with the plurality of key and value pairs, wherein the hashing includes executing a hash function to generate a hashed data object;
   comparing the hashed data object to a plurality of first hashed data objects;
   determining that the hashed data object does not match any of the first hashed data objects and, based on the determining, associating the hashed data object with the first hashed data objects to generate second hashed data objects;
   generating a schema for the database, the schema comprising a hierarchy of keys that represent the second hashed data objects;
   based on receiving a request for content stored in the database, generating a template using the schema to retrieve the content, wherein the template comprises a set of one or more executable queries that use the schema to organize the content; and
   providing, using the template, a version of the requested content in a graphical user interface.

22. The storage medium of claim 21, further comprising generating an ordered representation of the plurality of key and value pairs.

23. The storage medium of claim 22, wherein generating the ordered representation of the plurality of key and value pairs comprises ordering the keys associated with the plurality of key and value pairs according to a predetermined order.

24. The storage medium of claim 23, wherein hashing the keys associated with the plurality of key and value pairs comprises hashing the ordered representation of the plurality of key and value pairs using the hash function to generate the hashed data object, which comprises combining the ordered keys and then hashing the combination using the hash function.

25. The storage medium of claim 21, wherein the plurality of key and value pairs comprise one or more nested key and value pairs.

26. The storage medium of claim 21, wherein generating the schema for the database comprises:
  generating a directory for accessing content in the database, the directory configured to provide an association between the hierarchy of keys that represent the second hashed data objects and text corresponding to the keys associated with plurality of key and value pairs; and
  providing the directory to an application in response to receiving a request to retrieve content from the database.

27. The storage medium of claim 21, wherein the first hashed data objects represent telemetry data associated with a plurality of users accessing one or more virtual machines.

28. The storage medium of claim 21, wherein the schema is stored as a separate data object in the database.

29. The storage medium of claim 21, wherein comparing the hashed data object to the plurality of first hashed data objects comprises determining whether an object type of the hashed data object matches an object type associated with the first hashed data objects.

30. The storage medium of claim 21, further comprising inserting the data object into the database.

* * * * *